(12) United States Patent
Caruso

(10) Patent No.: US 7,780,096 B2
(45) Date of Patent: Aug. 24, 2010

(54) AGRICULTURAL MACHINE, ARRANGEMENT AND METHOD FOR DELIVERING A FLUID TO A DISPENSING SYSTEM

(75) Inventor: Robert L. Caruso, Bettendorf, IA (US)

(73) Assignee: Deere & Company, Moline, IL (US)

( * ) Notice: Subject to any disclaimer, the term of this patent is extended or adjusted under 35 U.S.C. 154(b) by 129 days.

(21) Appl. No.: 12/053,747

(22) Filed: Mar. 24, 2008

(65) Prior Publication Data

US 2009/0235852 A1 Sep. 24, 2009

(51) Int. Cl.
*B05B 1/30* (2006.01)
*B05B 7/32* (2006.01)
*F23D 11/24* (2006.01)
*F23D 14/28* (2006.01)
*F23D 14/34* (2006.01)

(52) U.S. Cl. ............... 239/146; 239/302; 239/303; 239/337; 239/569

(58) Field of Classification Search .......... 111/129, 111/118, 127; 239/146, 147, 159, 170, 172, 239/176, 722, 302–308, 337, 569–571
See application file for complete search history.

(56) References Cited

U.S. PATENT DOCUMENTS

| 3,653,550 | A  | * | 4/1972  | Williams     | 222/136 |
| 6,973,885 | B2 | * | 12/2005 | Fulgham      | 111/129 |
| 2005/0263053 | A1 | * | 12/2005 | Schaffert  | 111/189 |
| 2007/0131793 | A1 | * | 6/2007  | Joseph et al. | 239/302 |

* cited by examiner

*Primary Examiner*—Christopher J. Novosad
(74) *Attorney, Agent, or Firm*—Taylor IP, P.C.

(57) ABSTRACT

An agricultural machine includes a dispensing system configured to dispense an agricultural fluid; a pump fluidly coupled to the dispensing system; and an arrangement configured to provide the agricultural fluid to the dispensing system. The arrangement includes at least one first reservoir configured to store the agricultural fluid, the at least one first reservoir being fluidly coupled to the pump; a second reservoir configured to store the agricultural fluid, the second reservoir being fluidly coupled to the pump; and a throttling device in fluid communication with the second reservoir and the pump. The throttling device is configured to throttle a flow of the agricultural fluid from the second reservoir.

9 Claims, 3 Drawing Sheets

AGRICULTURAL MACHINE, ARRANGEMENT AND METHOD FOR DELIVERING A FLUID TO A DISPENSING SYSTEM

FIELD OF THE INVENTION

The present invention relates to an agricultural machine, and more particularly, to an arrangement and method for delivering a fluid to a dispensing system.

BACKGROUND OF THE INVENTION

Fluid dispensing systems are used in many applications to dispense fluids of various types. For example, in the agricultural industry, a seeder, such as a planter or a drill, or a sprayer may be used to dispense liquid insecticides, herbicides and/or soil nutrients, such as fertilizers. In many cases, the fluid may be drawn from multiple reservoirs that are sized for easy lifting and maneuvering, and may be subsequently diluted with water prior to its application onto the field being treated. The reservoirs may be sealed reservoirs, e.g., collapsible bags in which the fluid is stored, which may help prevent the accidental spill or other release of the fluid stored in the reservoirs. In any event, by using multiple reservoirs of a size and shape that is easy for a typical human operator to install and replace, it is possible to retain a substantial on-board supply of the fluid on the agricultural machine. However, present fluid dispensing systems lack the ability to control how reservoirs are emptied, and hence, situations may arise wherein all of the reservoirs are emptied during field dispensing operations, which may require that the reservoirs be replaced at an inconvenient time or location.

For example, an operator of a seeder would prefer to add insecticide to the system at the same time dilution water and seed are added. However, with present systems, the only way to ensure that all the insecticide in the reservoirs is used is to run the insecticide operations until all the reservoirs are empty, at which point the operator would have to reload fresh insecticide reservoirs. The timing at which this occurs may not coincide with when the seed and water supplies run out, and hence, the operator would have to again stop to replace seed and dilution water, resulting in a loss of productivity.

Notwithstanding advances in the art, there is a still a need for an agricultural machine, arrangement and method for delivering a fluid to a dispensing system.

SUMMARY OF THE INVENTION

The present invention provides an agricultural machine, arrangement and method for delivering a fluid to a dispensing system.

The invention, in one form thereof, is directed to an arrangement for providing a fluid to a dispensing system that is configured to dispense the fluid using a pump that is fluidly coupled to the dispensing system. The arrangement includes at least one first reservoir configured to store the fluid, the at least one first reservoir being fluidly coupled to the pump; a second reservoir configured to store the fluid, the second reservoir being fluidly coupled to the pump; and a throttling device in fluid communication with the second reservoir and the pump. The throttling device is configured to throttle a flow of the fluid from the second reservoir.

The invention, in another form thereof, is directed to an agricultural machine. The agricultural machine includes a dispensing system configured to dispense an agricultural fluid; a pump fluidly coupled to the dispensing system; and an arrangement configured to provide the agricultural fluid to the dispensing system. The arrangement includes at least one first reservoir configured to store the agricultural fluid, the at least one first reservoir being fluidly coupled to the pump; a second reservoir configured to store the agricultural fluid, the second reservoir being fluidly coupled to the pump; and a throttling device in fluid communication with the second reservoir and the pump. The throttling device is configured to throttle a flow of the agricultural fluid from the second reservoir.

The invention, in yet form thereof, is directed to a method for delivering a fluid to a dispensing system. The method includes applying a suction to at least one first reservoir storing the fluid and a second reservoir storing the fluid; restricting a flow of the fluid from the second reservoir; providing the fluid from the at least one first reservoir to the dispensing system; emptying the at least one first reservoir; and providing the fluid from the second reservoir to the dispensing system after the emptying the at least one first reservoir.

DETAILED DESCRIPTION OF THE INVENTION

Figure 1:
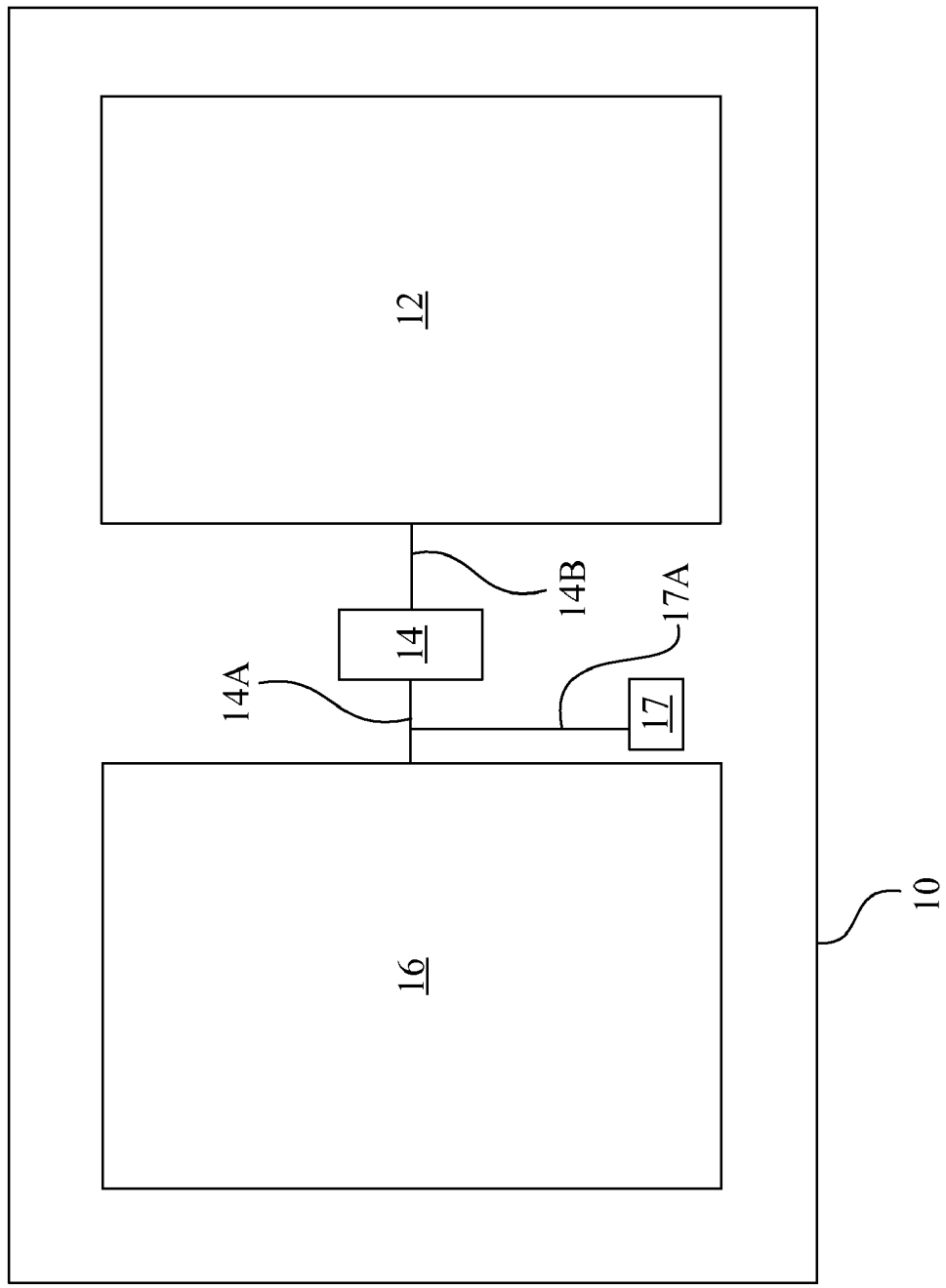
FIG. 1 is a schematic depiction of an agricultural machine having an arrangement for providing an agricultural fluid to a dispensing system in accordance with an embodiment of the present invention.

Referring now to FIG. 1, there is schematically shown a machine 10 in accordance with an embodiment of the present invention. In the present embodiment, machine 10 is an agricultural machine in the form of a seeder. During agricultural operations, machine 10 may be pulled across the field being treated by a base unit, e.g., an agricultural tractor (not shown). In other embodiments, machine 10 may take the form of another type of agricultural machine, such as a sprayer, and may also be self-propelled. In yet other embodiments, machine 10 may be any apparatus that is used to dispense fluids from more than one reservoir.

Machine 10 may include a dispensing system 12, a pump 14, an arrangement 16 configured to provide fluid to dispensing system 12, and an alarm 17. Dispensing system 12 of machine 10 is configured to dispense the fluid, e.g., an agricultural fluid such as an herbicide, an insecticide, a pesticide or a fertilizer or other soil nutrient during seeding operations. In other embodiments, the fluid may be any fluid sought to be dispensed, and machine 10 may be any machine configured to dispense the fluid by drip, stream or spray via single or multiple outlets, e.g. nozzles, that are controlled individually or as a group.

Dispensing system 12 is the operative part of machine 10 that controls the dispensing of the fluid from arrangement 16, and may include pumps (not shown) and valves (not shown) that determine the manner in which the fluid is dispensed, e.g., via nozzles or drip tubes aligned with crop rows, and the amount of fluid dispensed during normal operations of machine 10.

In the present embodiment, pump 14 is a pump/valve assembly. Pump 14 is fluidly coupled with arrangement 16 via an intake fluid line 14A, and fluidly coupled with dispensing system 12 via a discharge fluid line 14B. Pump 14 is considered to be separate from dispensing system 12 in the present embodiment, although in other embodiments, pump 14 may be considered part of dispensing system 12. In any case, pump 14 is configured to draw the fluid from fluid reservoirs, e.g., by generating a suction that pulls the fluid from the reservoirs, which may be assisted by gravity, and to provide the fluid to dispensing system 12, where it may be mixed, e.g., diluted with water, and dispensed as a mixture. In other embodiments, the fluid may be dispensed without dilution, such as where the fluid is in a ready-to-use form, e.g., a pre-mixed solution.

Alarm 17 is coupled to intake fluid line 14A via a sense line 17A. Alarm 17 is configured to sense the pressure in intake fluid line 14A. In the present embodiment, an increased suction in intake fluid line 14A indicates that one or more fluid reservoirs have been emptied. Alarm 17 is configured to provide the operator of machine 10 with a warning that some of the fluid reservoirs may be empty, based on the increased suction.

Figure 2:
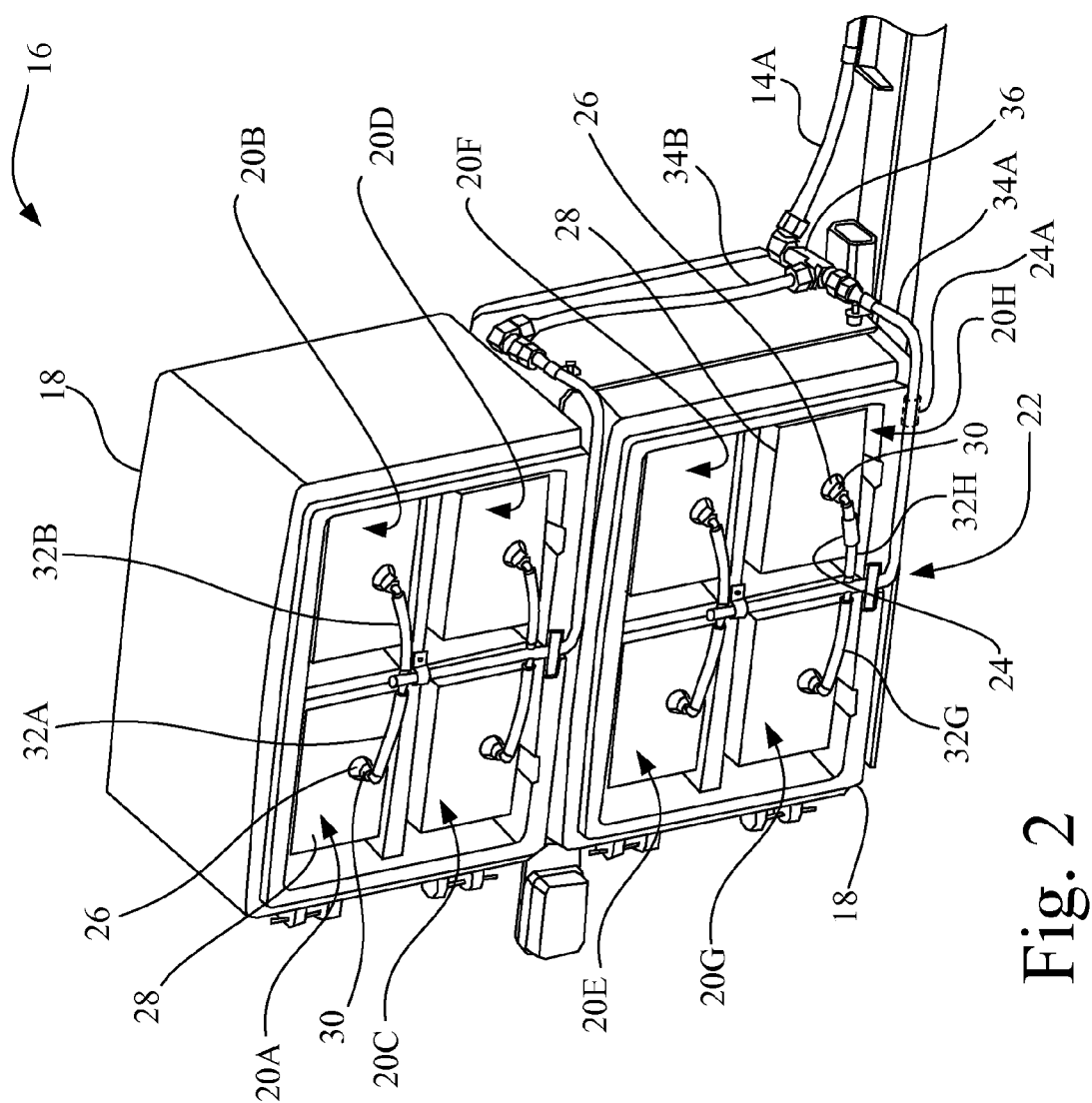
FIG. 2 is graphically depicts an arrangement configured to provide agricultural fluid to a dispensing system in accordance with the embodiment of FIG. 1.

Referring now to FIG. 2, arrangement 16 includes cabinets 18, a plurality of collapsible reservoirs 20A-20H, a manifold 22 and a throttling device 24. Cabinets 18 are configured to hold and secure reservoirs 20A-20H, which are themselves configured to store the fluid employed by dispensing system 12. Cabinets 18 may include doors (removed for purposes of clarity) which retain reservoirs 20A-20H in place during the operations of machine 10.

Each of reservoirs 20A-20H in the present embodiment is a collapsible reservoir in the form of a polymer bag 26 contained inside a box 28, which may be placed in cabinets 18 by the operator of machine 10. Boxes 28 may be vented so as to allow bags 26 to collapse and deflate as the fluid is drawn from them, without generating a back pressure as might otherwise prevent the collapse of reservoirs 20A-20H and/or otherwise possibly adversely affect the flow of fluid from reservoirs 20A-20H. In other embodiments, reservoirs 20A-20H may be any collapsible reservoir, such as other bags, bellows, diaphragm and/or piston/cylinder arrangements. Each bag 26 of reservoirs 20A-20H includes a nipple 30, which is configured for fluid connection to manifold 22 through which the fluid may be drawn for delivery to dispensing system 12.

Manifold 22 includes branches 32A-32H in one-to-one correspondence with reservoirs 20A-20H, and also includes stems 34A and 34B, and a T fluid fitting 36. Each of branches 32A-32H is fluidly coupled to a corresponding one of reservoirs 20A-20H at nipple 30 on one end, and fluidly coupled on the other end to respective of stems 34A and 34B. Stems 34A and 34B are fluidly coupled to T fluid fitting 36. T fluid fitting 36 is fluidly coupled to intake fluid line 14A. Each of reservoirs 20A-20H are thereby fluidly coupled to pump 14; the fluid may thus be drawn by pump 14 from reservoirs 20A-20H, through branches 32A-32H and stems 34A and 34B into T fluid fitting 36 and intake fluid line 14A for delivery to dispensing system 12 via pump 14.

Throttling device 24 is in fluid communication with one more of reservoirs 20A-20H that are desired, by design, to be the last to be emptied during normal operations of dispensing system 12. In the present embodiment, reservoir 20H is sought to be emptied last, and hence, throttling device 24 is positioned so as to restrict the flow of fluid from reservoir 20H. Accordingly, throttling device 24 is in fluid communication with reservoir 20H, and with pump 14 via manifold 22. Throttling device 24 is configured to throttle the flow of fluid flowing from reservoir 20H, e.g., by preventing flow below a predetermined pressure differential across throttling device 24. In the present embodiment, throttling device 24 is built into branch 32H of manifold 22. It is alternatively contemplated that throttling device 24 may be configured to mount on nipple 30 of reservoir 20H, and be fluidly coupled to branch 32H. However, it will be understood that in some embodiments, one or more throttling devices, may be positioned so as to restrict the flow of fluid from more than one reservoir, in series and/or parallel, so as to empty the reservoirs in a desired sequence. For example, another throttling device, e.g., throttling device 24A, may be incorporated into stem 34A to throttle the flow of fluid from a group of reservoirs, e.g., reservoirs 20E-20H, so that of reservoirs 20A-20H, reservoirs 20A-20D would be emptied first due to throttling device 24A throttling the flow of fluid from reservoirs 20E-20H. Of reservoirs 20E-20H, reservoirs 20E-20G would be emptied first, due to throttling device 24 throttling the flow of fluid from reservoir 20H. In such embodiments, the operating pressure differentials of throttling device 24A, e.g., cracking pressure and/or full flow pressure, may be lower than those of throttling device 24.

Figure 3:
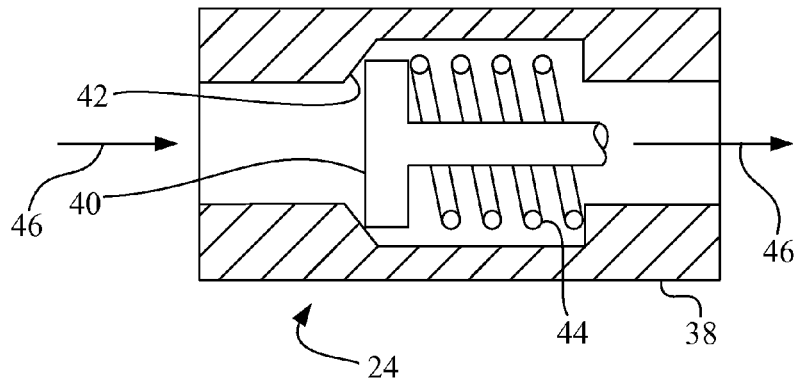
FIG. 3 schematically depicts a throttling device employed in accordance with the embodiment of FIGS. 1 and 2.

Referring now to FIG. 3, throttling device 24 is schematically depicted in cross section in a closed position. In the present embodiment, throttling device 24 is in the form of a poppet check valve, although it will be understood that other types of throttling devices may be employed without departing from the scope of the present invention. As a poppet check valve, throttling device 24 may include a body 38, a poppet 40, a seat 42, and a spring 44. Spring 44 provides a bias force to seat poppet 40 against seat 42 formed in body 38, and is thus configured to close throttling device 24 to thereby restrict flow from reservoir 20H. Spring 44 is configured to retain throttling device 24 in the closed position below a predetermined pressure differential across throttling device 24. In an exemplary embodiment, a throttling device 24 in the form of a poppet check valve having a cracking pressure differential of about 0.3 pounds per square inch (psi) and a full flow pressure differential of approximately 1.0 psi at 8-10 ounces per minute was found sufficient to prevent flow from reservoir 20H until reservoirs 20A-20G were emptied, while allowing flow from reservoir 20H after reservoirs 20A-20G were emptied. Upon sufficient suction generated by pump 14, in addition to any gravity head resulting from the height of the fluid relative to the height of poppet, the bias of spring 44 may be overcome, allowing flow to pass through throttling device 24 to pump 14 in direction 46 from reservoir 20H to dispensing system 12.

Figure 4:
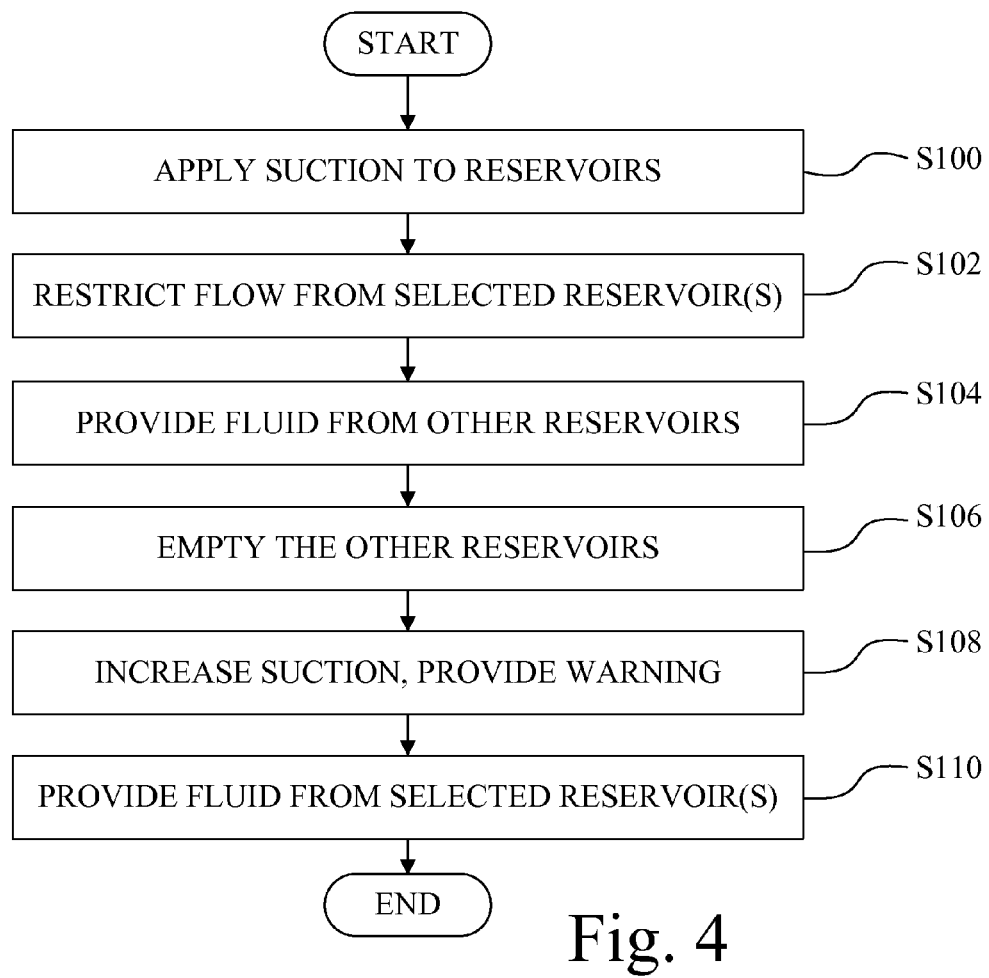
FIG. 4 is a flowchart depicting a method for delivering a fluid to a dispensing system in accordance with an embodiment of the present invention.

Referring now to FIG. 4, a method for delivering the fluid to dispensing system 12 is depicted in the form of a flowchart.

At step S100, a suction that does not achieve the cracking pressure of throttling device 24 is applied to reservoirs 20A-20H, e.g., by pump 14.

At step S102, the flow of fluid from one or more selected reservoirs that are sought to be emptied last, e.g., reservoir 20H in the present embodiment, is restricted by throttling device 24, e.g., since the suction provided at step S100 is insufficient to overcome the cracking pressure of throttling device 24.

At step S104, fluid from reservoirs 20A-20H is provided to dispensing system 12.

At step S106, reservoirs 20A-20G are emptied, e.g., during normal operations of dispensing system 12, which collapses reservoirs 20A-20G.

At step S108, the suction in manifold 22 is increased, e.g., by virtue of emptying and collapsing reservoirs 20A-20G, which opens throttling device 24 to permit flow from reservoir 20H. The increased suction is detected by alarm 17, which provides a warning to the operator that reservoirs 20A-20G have been emptied.

At step S110, fluid from reservoir 20H is provided to dispensing system 12 using the increased suction.

As set forth above, during the operation of machine 10 and dispensing system 12, fluid may be drawn out of reservoirs 20A-20G prior to being drawn out of reservoir 20H due to the operation of throttling device 24, and a warning may be provided to indicate to the operator of machine 10 and dispensing system 12 that reservoirs 20A-20G have been emptied. This may allow the operator of machine 10 to be able to use machine 10 and dispensing system 12 without interruption until a convenient time to replace some or all of the reservoirs.

For example, it is desirable that the operator replace the supply of the fluid stored in the reservoirs at the same time seed and water are added, which may increase the productivity of machine 10. However, in the absence of the present invention, each of the reservoirs may only be partially emptied by the time the operator needs to re-supply with water and seed. In such cases, the operator may not wish to replace the partially emptied reservoirs, since doing so would be a waste of financial resources. Instead the operator might replenish the on-board water and seed supplies, and begin field operations again. Once the fluid supply in the reservoirs is exhausted, the operator would again have to stop machine 10 in the middle of field operations to replace the emptied reservoirs. However, by forcing one or more reservoirs to not be accessed by dispensing system 12 until the other reservoirs are empty, reserve margin is provided, so that the operator may continue operations using the fluid in the remaining one or more reservoirs, e.g., reservoir 20H in the present embodiment. This may provide the operator with the flexibility to replenish the water and seed supplies, as well as the emptied fluid reservoirs at the same time. In addition, the increased suction resulting from the throttling device may result in a more complete emptying of the collapsible reservoirs, e.g., reservoirs 20A-20G.

Having described the preferred embodiment, it will become apparent that various modifications can be made without departing from the scope of the invention as defined in the accompanying claims.

The invention claimed is:

1. An agricultural machine, comprising:
   a dispensing system configured to dispense an agricultural fluid;
   a pump having an intake line and a discharge line, said discharge line being fluidly coupled to said dispensing system; and
   an arrangement configured to provide said agricultural fluid to said dispensing system, including:
   at least one first reservoir configured to store said agricultural fluid, said at least one first reservoir being fluidly coupled to the intake line of said pump;
   a second reservoir configured to store said agricultural fluid, said second reservoir being fluidly coupled to the intake line of said pump; and
   a throttling device in fluid communication with said second reservoir and said pump, said throttling device being configured to throttle a flow of said agricultural fluid from said second reservoir.

2. The agricultural machine of claim 1, wherein said agricultural machine is one of a seeder and a sprayer.

3. The agricultural machine of claim 1, wherein said throttling device is a check valve.

4. The agricultural machine of claim 3, wherein said check valve includes a spring configured to close said check valve to thereby restrict said flow from said second reservoir.

5. The agricultural machine of claim 4, wherein said spring is configured to retain said check valve in a closed position below a predetermined pressure differential across said check valve.

6. The agricultural machine of claim 3, said arrangement further including a manifold coupled to said pump, said manifold including at least one first branch fluidly coupled to said at least one first reservoir and a second branch coupled to said second reservoir.

7. The agricultural machine of claim 6, wherein said check valve is disposed in said second branch of said manifold.

8. The agricultural machine of claim 1, wherein said at least one first reservoir is a collapsible reservoir.

9. The agricultural machine of claim 1, said arrangement further including:
   a second throttling device; and
   a group of reservoirs, of which said second reservoir is a part, wherein said second throttling device is configured to throttle said flow of said fluid from said group of reservoirs.

* * * * *